F. G. HODELL.
MACHINE FOR CUTTING BUTTER, CHEESE, AND THE LIKE.
APPLICATION FILED JUNE 24, 1907.
899,533.
Patented Sept. 29, 1908.
2 SHEETS—SHEET 1.
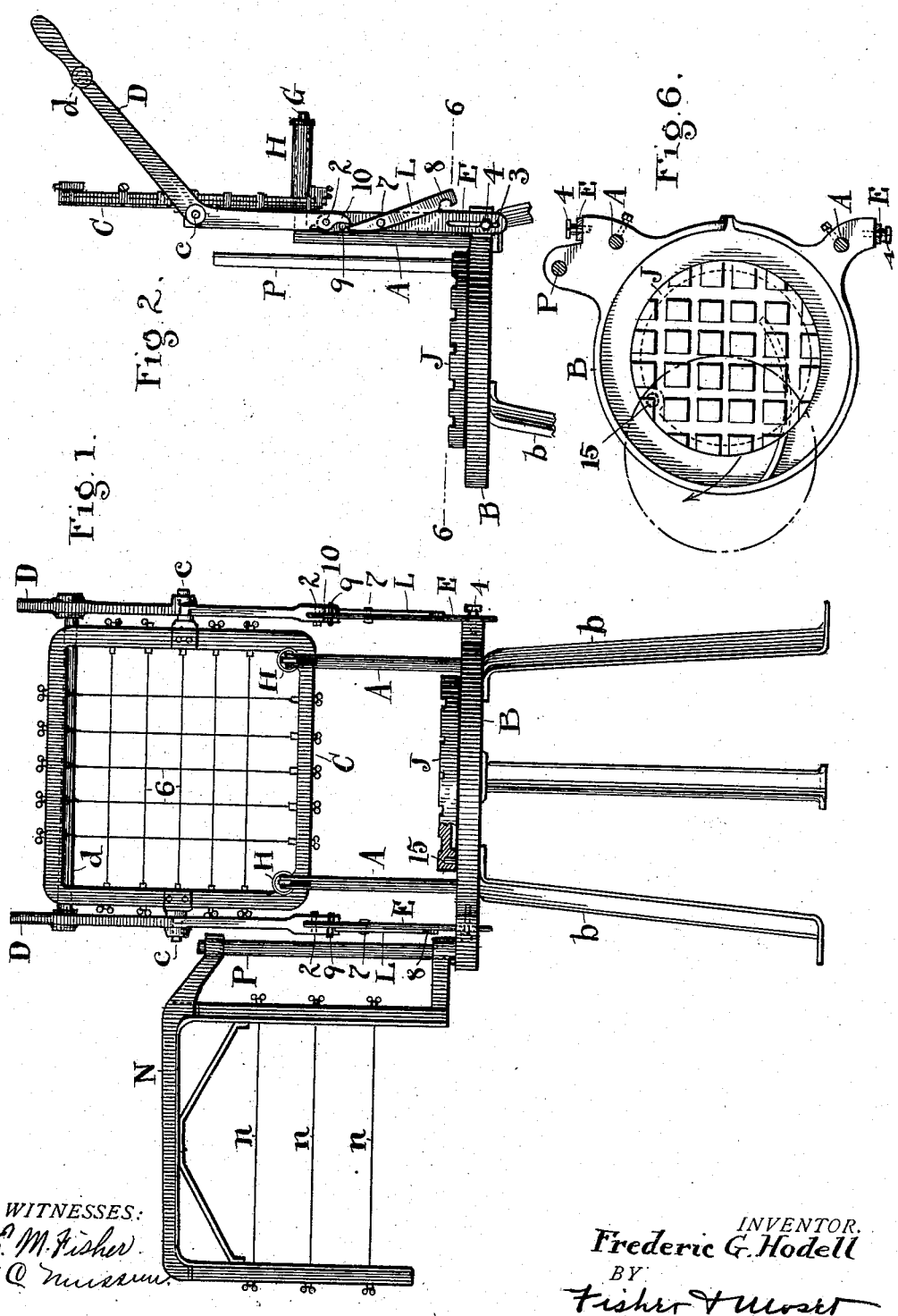
INVENTOR.
Frederic G. Hodell
BY
Fisher & Moset
ATTORNEYS

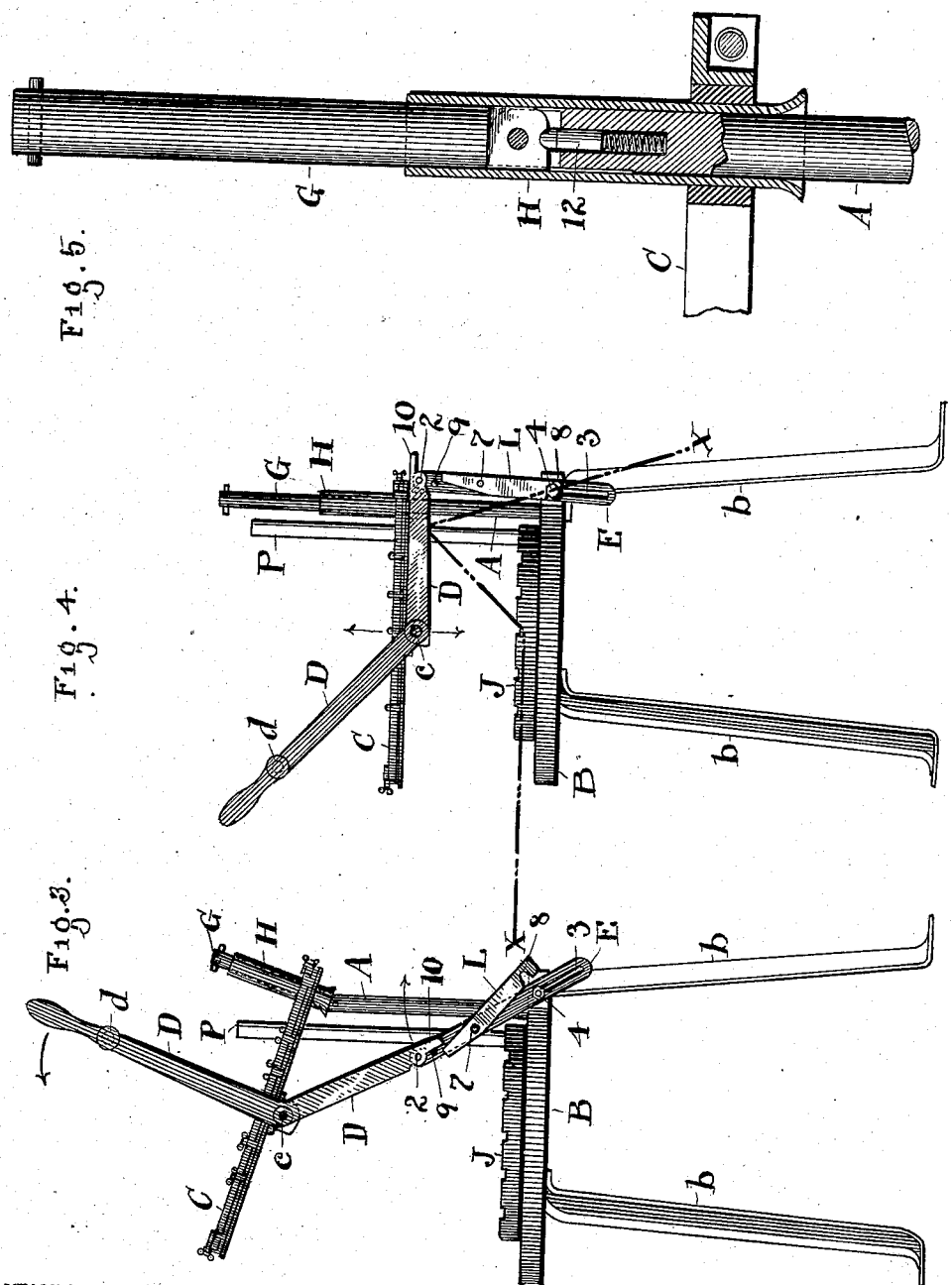

UNITED STATES PATENT OFFICE.

FREDERIC G. HODELL, OF CLEVELAND, OHIO.

MACHINE FOR CUTTING BUTTER, CHEESE, AND THE LIKE.

No. 899,533.      Specification of Letters Patent.      Patented Sept. 29, 1908.

Application filed June 24, 1907. Serial No. 380,377.

*To all whom it may concern:*

Be it known that I, FREDERIC G. HODELL, a citizen of the United States, residing at Cleveland, in the county of Cuyahoga and State of Ohio, have invented certain new and useful Improvements in Machines for Cutting Butter, Cheese, and the Like, and do declare that the following is a full, clear, and exact description of the invention, which will enable others skilled in the art to which it appertains to make and use the same.

My invention relates to a machine for cutting butter, cheese and the like, and the invention consists in the construction and com15 bination of parts, substantially as shown and described and particularly pointed out in the claims.

In the accompanying drawings, Figure 1 is a front elevation of the machine with the cutters retired, as in Fig. 2, and Fig. 2 is a side elevation of the machine. Fig. 3 is a side elevation of the machine showing the vertical cutter in first position of rest, which it may assume when raised from action or when lowered or turned from erect position Fig. 2. Fig. 4 is a side elevation showing the vertical cutter part way down as in cutting, and as hereinafter more fully described. Fig. 5 is an enlarged partially sectional eleva30 tion of a post and sleeve for the vertical cutter frame. Fig. 6 is a plan view and section on line 6—6 Fig. 2.

This machine is designed especially for cutting tubs of butter into bricks, or blocks of a size corresponding to pound prints, and the plan of construction and operation provides for first slicing or cutting the butter horizontally and then vertically, said operations being successive and by different cut40 ters which remain operative upon the machine, as will now appear. Thus, B represents the bed or base of the main frame of the machine, which may be suitably supported but in this instance stands on legs $b$ at a con45 venient elevation, say about three feet, and two rigid cylindrical posts or standards A are fixed upon the rear of said base upon which the vertical cutter or cutter frame C is operatively mounted, primarily. That is the immediate and governing support of said frame at its rear is upon these posts, while the secondary support by or through which the working position of frame C is largely determined is in or through the side connections comprising operating levers D. Said levers are rigidly connected by a cross rod or round $d$ and are pivotally supported in their angles centrally at the sides of frame C on pivot projections $c$ rigid with said frame. Said levers D work together as a rigid frame by reason of their rigid cross connection $d$ and their fixed pivot connections at $c$ with frame C, and further operating and supporting connection is made with said levers and the rear of base plate B by means of links E. Said links are pivotally connected at their upper ends in the lower ends of said levers at 2 and have slots 3 lengthwise in their lower ends engaged by bolts or pins 4, which are headed outside said slots and are fixed in the edge of said base B. The length of said slots 3 corresponds to the necessary lengthwise movements of links E to adapt them to the changing positions of the said levers and cutter frame C thereon and on its rear supports or standards A, as seen in Figs. 2, 3 and 4, respectively. Said links E are therefore extensible, and any convenient style of link connection can be used.

In Fig. 2 the frame C stands erect at the rear of base B in its extreme position of retirement and in which it is supported by posts A plus the auxiliary or extension joints G, pivoted on the top of posts A and adapted to be turned into horizontal position relatively as seen in Fig. 2, or to occupy an inclined position, Fig. 3, or a vertical position, Fig. 4, in direct alinement with posts A. The means for making operative engagement by frame C with said posts A and their top or jointed extensions in this instance consists of sleeves or tubes H fixed in the corners of frame C and having approximately the same length as extension G and adapted to slide wholly upon the said extensions when frame C is raised as in Figs. 1, 2 and 3, and also to slide upon fixed posts A and run downward thereon when frame C is lowered to cut the butter. In this action the said sleeves and posts A serve mostly as guides and levers D as means for handling said frame and which can descend only in a horizontal plane after it reaches a fully turned position from Fig. 3 to Fig. 4. In this descent or downward movement links E with auxiliary hooks or latches L become the immediate rear fulcrum members for levers D, and after running down to the ends of slots 3, as in Fig. 3, said links are held there by hooks L, which take the strain to the end of the cutting operation by frame C. This engagement of hooks L takes place as soon as there is a horizontal position obtained by frame C, and thence downward the said frame is guided by standards A. When all the way down onto the porcelain or like butter cutting table J, levers D and links E assume position relatively as seen by dotted line $x-x$, said links moving inward at the top as the angles of lever B pass to the lower planes until cutter C comes down hard upon table J with its wires 6 in the grooves of said table.

It is to be especially observed that cutter frame C has its wires 6 at right angles so as to cut the butter into cubes or blocks by one downward movement of said frame, and this is rendered possible by reason of the peculiar construction and relation of my levers D and the fulcrum links and hooks at their rear. It will be seen that the lower portion of said levers or arms D below pivot $c$ on frame C are materially shorter than the upper or fore arms, and that hooks L come into action at the moment and in the manner which makes them most effective for power applied through said levers, so that the leverage thus obtained makes it comparatively easy to cut the butter in blocks vertically by a single downward sweep of frame C. Said latches L are pivoted at 7 on links E and have hooks 8 adapted to engage upon the pins or projections which confine links E and behind the heads thereon. Said latches drop into engagement by gravity but are mechanically released by extensions 10 on levers D. Stop pins or lugs 9 on links E engage the projecting extremities of levers D and stiffen the joints of said parts when they are erect, Fig. 2, or inclined as in Fig. 3. The said parts pass the dead center to the rearward in Fig. 3 and hence this rigidity in joint 2 is necessary.

The means for cutting the butter horizontally comprise cutter frame N which is pivoted like a gate on fixed posts P and has as many cutting wires $n$ as may be needed to make blocks of the desired size. Said post P is supported on base B at one side and rear out of the way of frame C and its operating parts, so that both cutting frames remain on the machine as a part thereof and neither need be removed to make room for the other. The vertical cutter frame and its standards being well behind butter table J and out of the way it is convenient for frame N to sweep across said table horizontally and cut the butter, when it is swung back again in the same direction. Extension or jointed standard ends G have spring pressed detents 12 which hold them erect when sleeves H run down onto the main standards. Cutting table J for the butter is horizontally rotatable on pivot pin 15, which is at one side and wholly off center of said table so that the table may be swung bodily forward and make it more convenient for placing the butter thereon in bulk than it would be otherwise.

What I claim is:—

1. A butter cutter comprising a suitable base, a cutter frame and a combined slide and fulcrum support at the rear thereof adapted to guide said frame vertically and tilt the same rearwardly, and means connected with said frame and base to raise and lower and tilt said frame on said support.

2. A butter cutter comprising a suitable base, a cutter frame and a jointed support therefor adapted to guide the same for vertical and tilting movements, and means to operate said frame in connection with said jointed support to cut the butter vertically and to rest said frame in raised position at the rear of said support.

3. A butter cutter having a suitable base and jointed standards on the rear thereof, a cutter frame slidably and tiltably mounted on said standards and operating levers having slidable link connection with said base and pivotally engaged with the sides of said frame.

4. A butter cutter machine comprising a base and rigid standards on the rear thereof, a cutter frame slidably engaged on said standards, levers pivoted on the sides of said frame and links engaging the ends of said levers with said base and pivotally secured to the base outside said standards.

5. A butter cutter machine comprising a suitable base, a cutter frame having sleeves fixed in its rear corners and standards on the rear of said base on which said sleeves are slidably engaged, an operating lever on each side of said cutter frame and extensible links connecting the rear ends of said levers with said base.

6. A butter cutter having a suitable base and standards rigid with the rear thereof, a cutter frame and sleeve fixed therein slidable on said standards, angular levers having pivot connection in their angles with said frame, extensible link connections between the rear ends of said levers and said base, and pivots for said links in said levers and on said base.

7. A butter cutter having a suitable base and standards on the rear thereof having extensions pivotally mounted on the top thereof, in combination with a cutter frame and sleeves thereon adapted to slide upon said extensions, and levers for operating said frame having adjustable hook and link connections at their inner ends.

8. A butter cutter having a base and standards thereon having jointed top extensions, in combination with a cutter frame and sleeves fixed thereon slidably mounted on said standards and adapted to pass wholly onto said extensions, levers pivoted at the sides of said cutter frame and independent link and hook connections at the rear ends of said levers with said base.

9. A butter cutter comprising a vertical cutter frame with cutter wires at right angles to each other, levers for operating said frame and standards at its rear on which the frame is slidable, extensible links attached to the rear ends of said levers and means adapted to limit the extension of said links.

10. A butter cutter having a suitable support and standards on the rear thereof, a cutter frame slidable on said standards and operating levers engaged with the sides of said frame, extensible links connecting said levers with said support, and latches mounted on said links adapted to limit the extension thereof.

11. The base and the vertical cutter frame mounted thereon, levers for operating said frame, extensible links connecting said lever and base and hooked latches mounted on said links and having operating engagement with the extremities of said levers.

12. A butter cutter machine having a supporting base for the butter, a vertical cutter frame and operating means therefor mounted and arranged to stand at one and the same side of said base, in combination with a horizontal cutter frame pivotally supported at one side of said vertical cutter frame and adapted to swing past the same in front thereof, and all said parts relatively arranged and mounted to provide a machine with three unobstructed sides above said base.

13. A butter cutter having a suitable base and a rigid standard on one side of said base and a cutter frame supported on said standard and adapted to swing horizontally over said base to cut the butter on horizontal lines, in combination with a cutter frame supported to slide on vertical lines and adapted to tilt, and means to operate the same for this dual movement, and both said cutter frames and said operating means being located on one and the same side of the base and adapted to leave the other sides thereof free and without obstructions for convenience in handling the butter in bulk and after cutting operations.

14. In butter cutters, a supporting base, in combination with a butter supporting table having pivot connection off its center on said base and adapted to be rotated horizontally to the side of said base on said pivot.

15. A butter cutter consisting of a suitable base for the butter and a cutting frame slidably mounted at the rear thereof, and lever connections having pivotal engagement with said frame and a slidable pivotal engagement with said base adapting both said frame and its operating connections to be shifted to one and the same side of the base, said base being otherwise open and unobstructed at all other points.

In testimony whereof I sign this specification in the presence of two witnesses.

FREDERIC G. HODELL.

Witnesses:
E. M. FISHER,
F. C. MUSSUN.